Oct. 7, 1958  B. E. ANDERSSON  2,855,188
EXTENSIBLE LADDER FOR DRIVING RAISES
Filed May 12, 1953  9 Sheets-Sheet 1

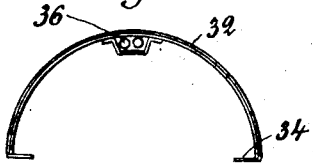
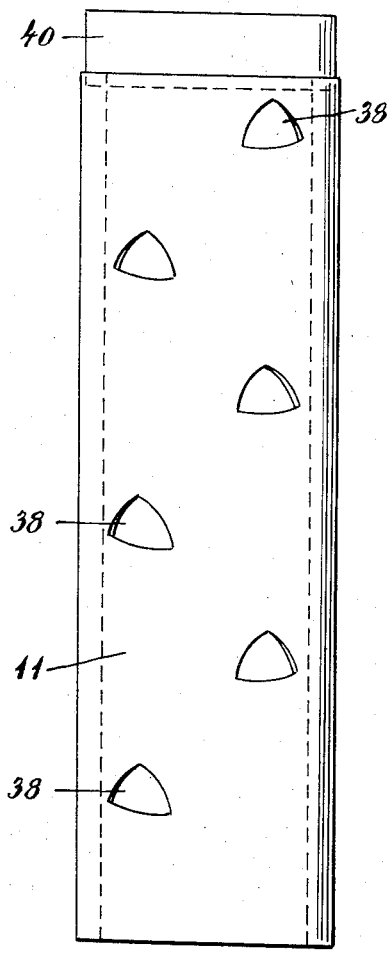
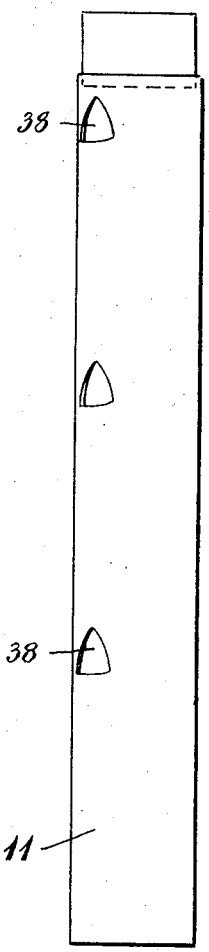

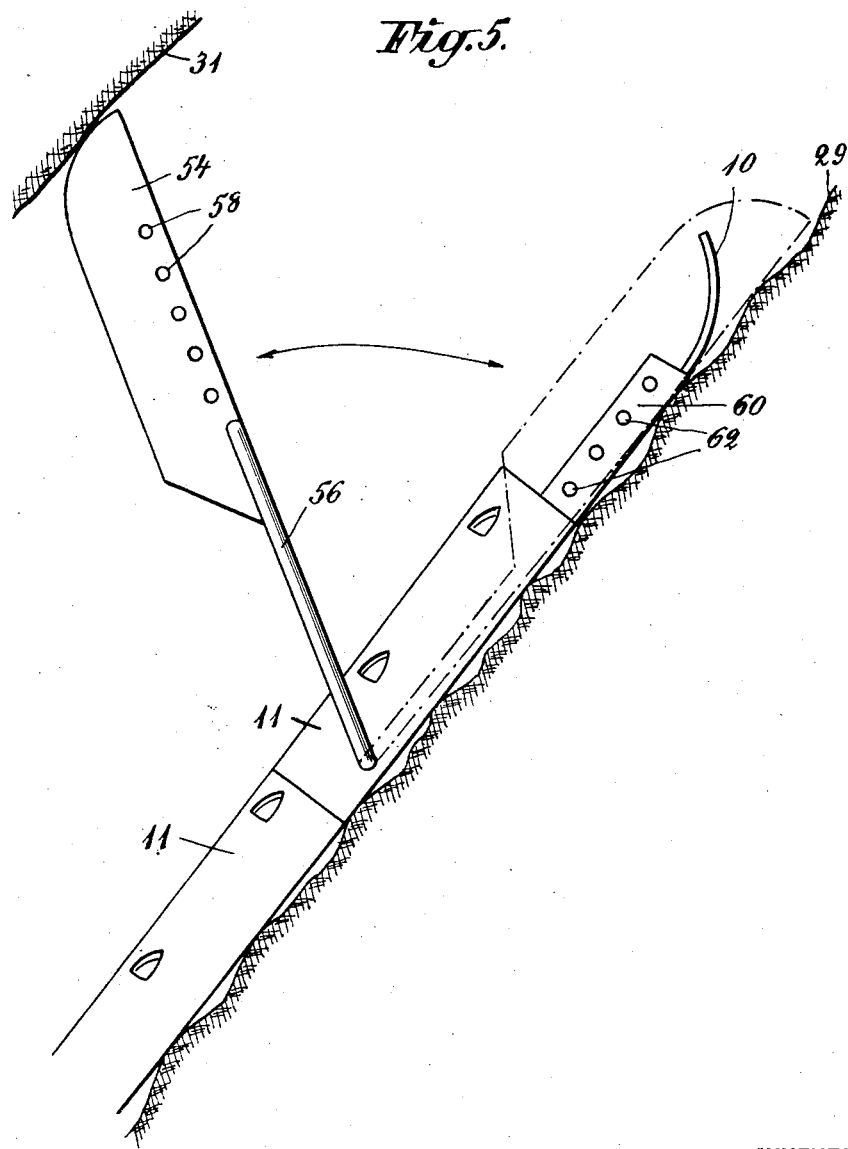

Oct. 7, 1958  B. E. ANDERSSON  2,855,188
EXTENSIBLE LADDER FOR DRIVING RAISES
Filed May 12, 1953  9 Sheets-Sheet 6

Oct. 7, 1958  B. E. ANDERSSON  2,855,188
EXTENSIBLE LADDER FOR DRIVING RAISES
Filed May 12, 1953  9 Sheets-Sheet 7

INVENTOR.
BY

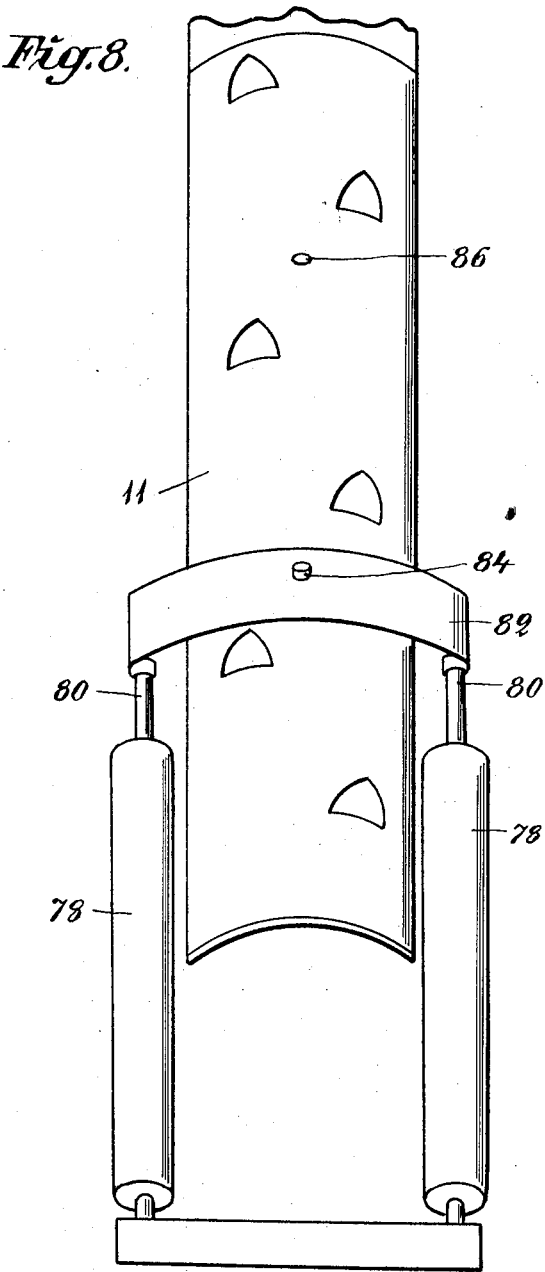

Oct. 7, 1958        B. E. ANDERSSON        2,855,188
EXTENSIBLE LADDER FOR DRIVING RAISES
Filed May 12, 1953        9 Sheets-Sheet 9
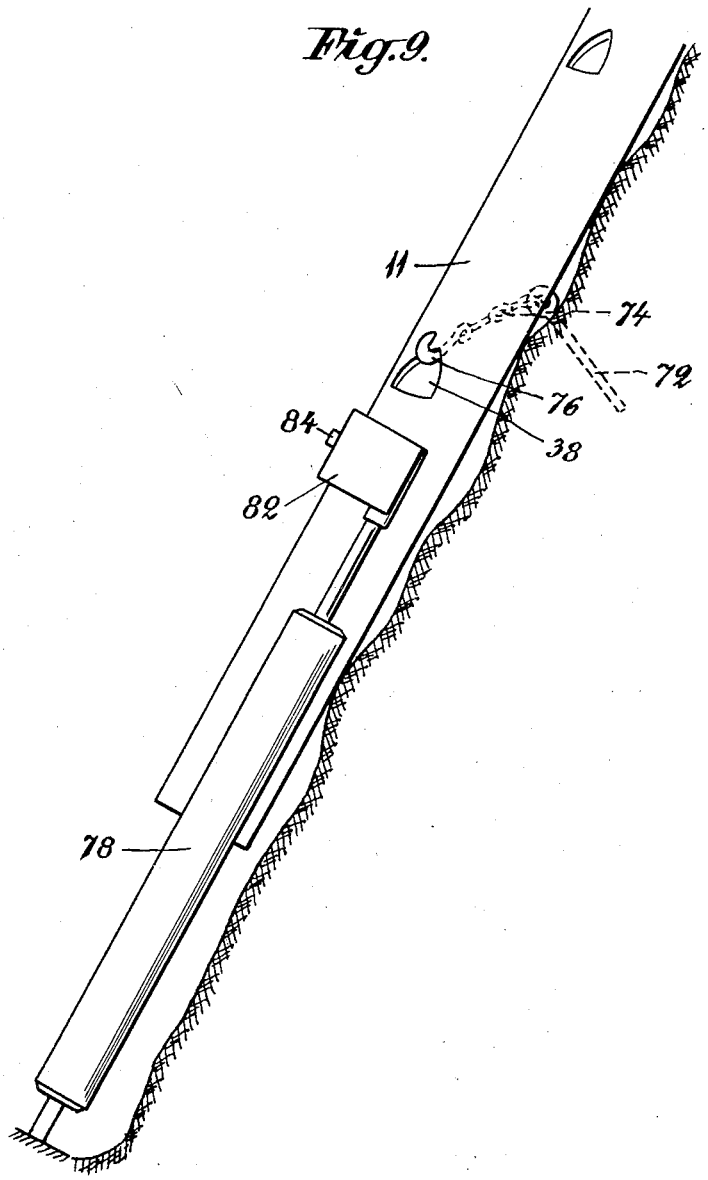

United States Patent Office 2,855,188
Patented Oct. 7, 1958

2,855,188

EXTENSIBLE LADDER FOR DRIVING RAISES

Björn Erik Andersson, Ludvika, Sweden, assignor to Atlas Copco Aktiebolag, Nacka, Sweden, a corporation of Sweden Application May 12, 1953, Serial No. 354,514

7 Claims. (Cl. 262—8)

This invention relates to means for driving raises or other inclined or vertical shafts in rock, or ore, or other material for mining or other purposes. One object of the invention is to provide a means for driving raises with the aid of a device which is assembled and extended in connection with the progress of the raise and which may be disassembled and taken down and used for driving further raises. Another object of the invention is to avoid the heavy cost and waste of time for building and taking down the timbering which it has been common practice heretofore to provide in connection with the driving of raises. For these and other purposes I provide a container forming a sheltered space during blasting for equipment used at the working face of the raise, an extensible ladder forming a shelter for conduits carried along said ladder to said working face and carrying said container, and a device for raising the ladder and the container along the raise.

Various other features of the invention are obvious from the following specification and the claims, and it should be understood that the invention is not limited to the illustrated embodiments of the invention but may be varied in different ways within the scope of the claims.

Figure 1:
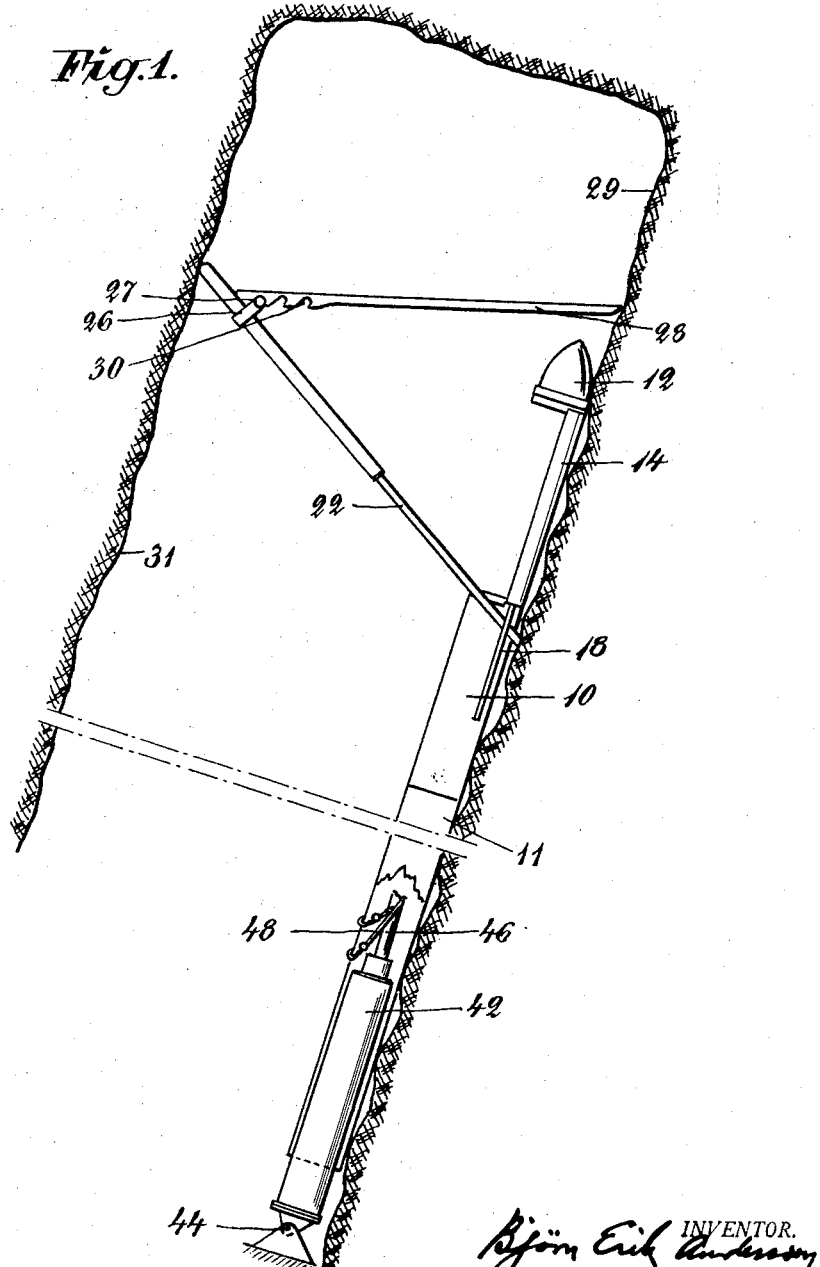
Figure 2:
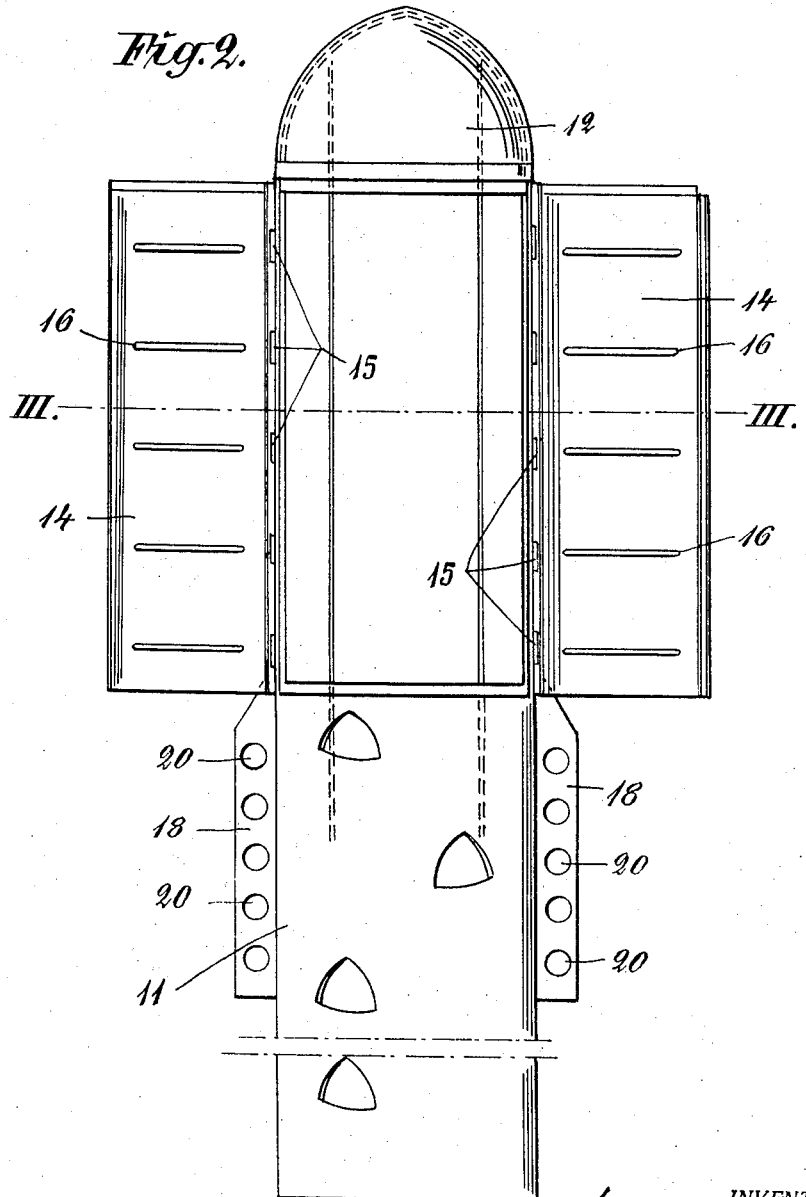
Figure 3:
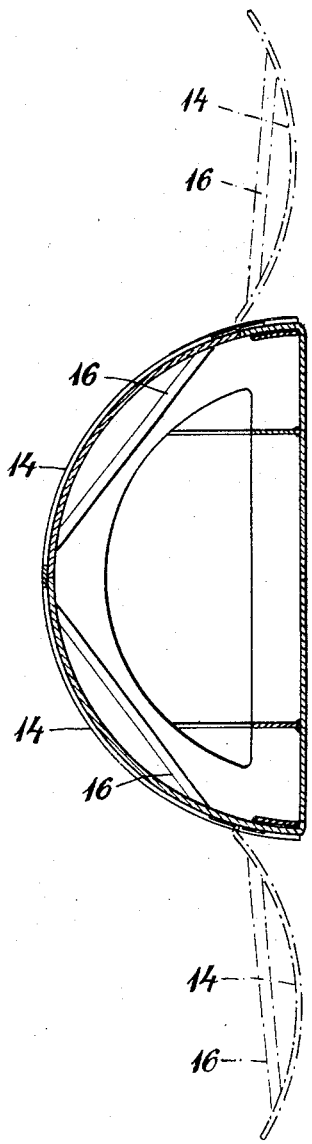
Figure 6A:
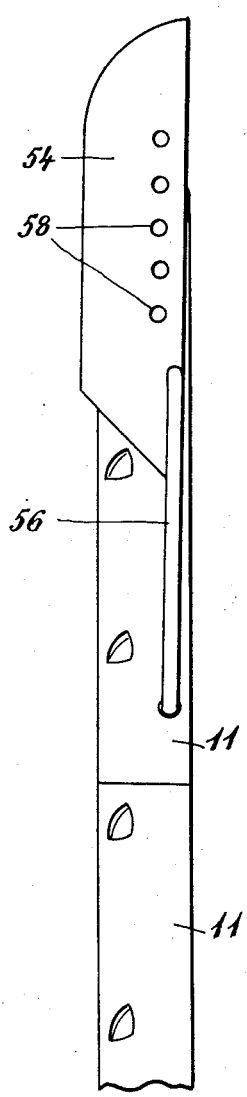
Figure 6B:
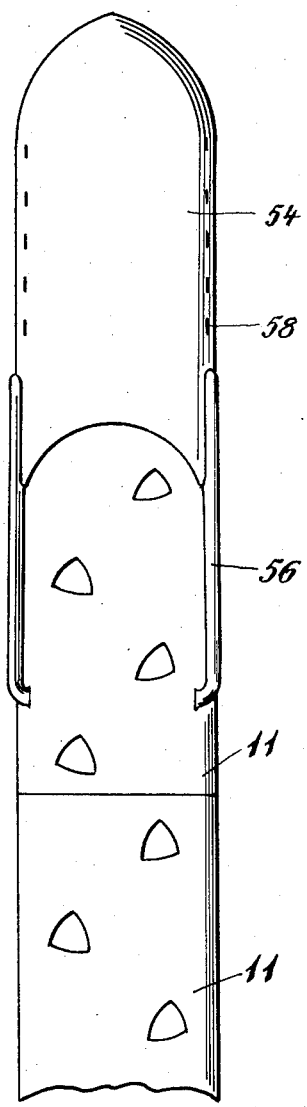
Figure 7:
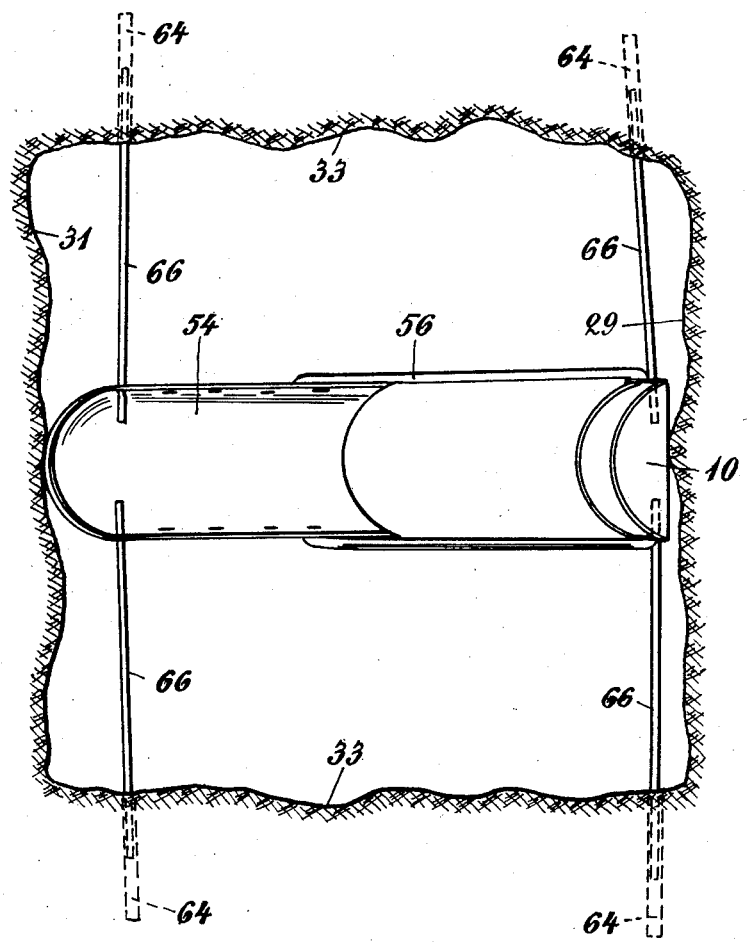

In the accompanying drawings two embodiments of means according to the invention are illustrated by way of example. Fig. 1 is a vertical longitudinal section of an inclined raise provided with the means according to the invention in a position in which a working platform is provided near the working face of the raise. Fig. 2 is an elevation of a torpedo type container for equipment according to the invention. Fig. 3 is a section on lines III—III of Fig. 2. Fig. 4a is an elevation of a ladder section, Fig. 4b is an end view of said ladder section, and Fig. 4c is a side view of the section. Fig. 5 illustrates a container for equipment according to a further embodiment of the invention in open position. Fig. 6a is a side view and Fig. 6b an elevation of the container according to Fig. 5 and of adjacent ladder sections. Fig. 7 is a view looking down the raise according to Fig. 5 with the container in open position. Fig. 8 is an elevation and Fig. 9 a side view of a further embodiment of a device for raising the ladder in the raise.

In the embodiment according to the invention illustrated in Figs. 1–3 a container for equipment, such as rock drills, drill steels, platform sections, supporting members for the platform sections, air and water supply hoses, et cetera is formed as a torpedo shaped sheet steel container or shell which as a whole is indicated by the reference numeral 10. The container 10 is situated and carried by a sheet steel ladder comprising sections 11, which are mounted one on top of the other. The container has a rounded end portion 12 which is shaped in such a way that loose rock blasted down over the container is not likely to catch on the container. The rounded end portion 12 slides upwards along the rough wall of a raise when the container is advanced along the wall. Below the end portion 12 the container is provided with two lids or doors 14 which are curved in order to better resist the action of loose falling rock and through which the interior of the container is accessible. The lids 14 are hinged to the side walls of the container at 15, as is obvious from Fig. 2. When drilling and other work at the face of the raise has been completed tools and platform material and other equipment are stowed away in the container, in which it is sheltered from falling rock. On the inside of the lids 14 reinforcing ribs 16 are provided which strengthen the lids and form foot steps on which the workers may stand during the erection or dismounting, respectively, of the platform and the supporting structure. The uppermost ladder section 11 which is coupled to the container is provided with two side flanges 18 having a number of holes 20 for extensible supporting members 22 which may be inserted in the holes 20 and in extended position rest against the corners of the hanging wall of the raise, as is obvious from Fig. 1. The members 22 are of adjustable length and are provided with means known per se for fixing the length of the members. For instance, through bolts may be provided in suitable holes in two telescopic portions forming the extensible members by means of which the length of the members may be fixed in a suitable way, or a split bushing with external tapering screw threads may be provided on one of the portions forming the members and engage in internal tapering screw thread in the other tubular portion to lock the member portions to each other in a desired extended position when the screw threaded bushing is tightened. At the free end of the members 22 brackets 26 for a horizontal cross bar 27 are provided, said cross bar forming a support for the working platform. The working platform may comprise a number of sheet metal planks 28 shaped as channels and having recesses in the downwardly directed flanges of the channels, as indicated at 30 in Fig. 1. The planking sections may engage the cross bar 27 by means of said recesses at one end, the other end resting, for instance, on the wall 29 of the raise, as is obvious from Fig. 1. The sheet metal planking may be made of sections of varying breadth which may be packed one in the other when they are stowed away in the container thereby saving a lot of space. Before the face of the raise is blasted down the planking 28 and the supporting members 22 are taken down and stowed away together with other equipment and drills in the container 10, the lids 14 of which are then closed. Obviously, according to the invention it is not necessary to move the drills and other equipment down through the already finished portion of the raise before each blasting, but all of said equipment may be left close to the working place. When the work is again started after blasting and removal of loose material the ladder is raised a suitable distance by means of a lifting device to be described below, the supporting structure and the working platform is again mounted, and the drills and other equipment are taken out from the sheltered position in the container. Obviously, considerable transportation work can thus be avoided so that the efficiency in time for driving the raise is increased.

In Figs. 5–7 a further embodiment of the container 10 is illustrated which differs from the one above described substantially in that instead of the hinged lids the container according to Figs. 5–7 consists of a cap 54 which by means of members 56 is connected to and pivotally journalled on the uppermost ladder section 11 so that it may be folded over said section which forms a compartment for receiving drills and other equipment. Holes 58 are provided in the cap 54, and the container 10 is provided with angle irons 60 having a number of holes 62. When the working platform is to be mounted the cap 54 is swung towards the hanging wall 31 of the raise and a number of short holes 64 are drilled in the side walls 33 of the raise, as illustrated in Fig. 7. Rods 66 are then inserted in the holes 64, 58 and 62, said rods forming supports for suitable planking forming the working platform.

As has already been indicated the structure carrying the container for drills and other equipment consists of a sectional ladder. In Figs. 4a-4c one embodiment of a section 11 of said ladder is illustrated. As is obvious from Fig. 4b the ladder section 11 comprises a sheet steel shell 32 of substantially semicircular cross section provided with inwardly directed flanges 34 at the longitudinal edges of the shell, said flanges 34 forming sliding surfaces on which the ladder slides on the lower wall 29 of the raise during the movement of the ladder along the raise according to the invention. The flanges 34 may sometimes be dispensed with or they may have other shapes. On the inside of the shell 32 clamps 36 are provided for conduits for conveying compressed air, water and electricity to the working face, and said conduits are disposed in a sheltered position near the top of the ladder cross section so that they may be left in the shell during blasting of the rock. The conduits which are connected to suitable sources of compressed air, water and electricity at the foot of the ladder extend into the container 10. They may naturally be clamped in sheltered position on the sliding flanges 34 or in other places within the shell. Ventilation conduits may also be provided in the shell if necessary. According to the invention it is not necessary to take down the conduits during blasting, since they are well protected in the container and the ladder sections.

The ladder sections 11 are provided with a number of cut out foot step openings 38 on each side of the centre plane of the shell 32, the lower edges of said openings forming the foot steps. At one end the shell is provided with a flange 40 which fits into the unflanged end of an adjacent shell so that the shells may be mounted one upon the other and are then held firmly together. The ladder formed by the shells thus operates substantially as a rigid ladder which is capable of taking the load of the platform 28 and container 10 and of the drills and workers operating thereon.

For the purpose of advancing or retracting the ladder along the raise a compressed air driven device may be supplied, one embodiment of which is illustrated at the bottom of the ladder according to Fig. 1 and another in Figs. 8 and 9. The lifting device according to Fig. 1 consists of a single pneumatic cylinder 42 provided with a hinged foot portion 44 which rests on a concrete support or other suitable base at the bottom of the raise. The cylinder 42 which is supplied with compressed air over a suitable control valve from a compressed air system is disposed within the lower section 11 of the ladder and is consequently protected from loose rock falling down over the ladder. When the ladder is to be advanced or raised the piston rod 46 of the cylinder is connected to the lower ladder section 11 by means of lifting straps 48 provided with hooks which may, for instance, fit the ladder section openings 38. Compressed air is then supplied to the cylinder 42 moving the piston and piston rod 46 upwardly and thereby advancing the ladder along the lower wall 29 of the raise. The ladder is then fixed in the advanced position, for instance by means of a bolt 72, as illustrated in Fig. 9, carrying a chain 74 and a hook 76 which is inserted in a suitable opening 38 of the lower ladder section 11. The piston rod 46 may then be disconnected from the ladder section 11 and the coupling flange 40 of a further ladder section 11 is inserted at the lower end of the section 11 which rests on the hook 76. The inserted section 11 is connected to the piston rod straps 48 and extension of the ladder and raising of the ladder and the container may be repeated as the work proceeds at the working face of the raise.

The embodiment of the lifting device illustrated in Figs. 8 and 9 comprises two pneumatic cylinders 78 disposed one at each side of the lowermost ladder section 11. The piston rods 80 of the pneumatic cylinders are connected by means of a cross member 82 provided with a pin 84 which, when the lifting device engages the ladder, is inserted in a hole 86 in the corresponding ladder section. The ladder sections may be provided with a number of such holes so that the advance of the ladder along the raise may be carried out to suit the work at the working face. Between each lifting operation the ladder is secured by means of the bolt and hook device 72, 74, 76 illustrated in Fig. 9. Since the lifting device according to Figs. 8 and 9 is not protected against falling material it is advisable to remove it before blasting down the rock.

The embodiments of the invention above described and illustrated in the drawings should be considered only as examples and the invention may be modified in several different ways within the scope of the claims. A suitable windlass and a sheave a short distance from the bottom of the raise over which the cable is carried may replace the pneumatic cylinders 42 or 78. A manually operated jack may also be used. The invention also includes the ladder sections per se.

What I claim is:
1. Apparatus for use in driving raises by alternating driving and blasting operations at the working face of the raise, comprising a container for driving equipment, said container being capable of resisting loose material blasted down thereover by blasting operations and forming a base for a working platform used during driving operations, a ladder comprising a number of sections including a section carrying said container, said ladder providing a sheltered passage for conduits extending therethrough and conducting media for actuating power-operated equipment utilized at the working face of the raise, and means for lifting said ladder sections to extend the ladder along the raise.

2. Apparatus for use in driving raises by alternating driving and blasting operations at the working face of the raise, comprising a steel container providing a sheltered space for storage during blasting operations of equipment used at the working face of the raise and forming a base for a working platform used during driving operations, a plurality of steel ladder sections including a section carrying said container and providing a steel-walled passage for conduits extending through the ladder and conducting media for actuating power-operated equipment utilized at the working face of the raise, and a device for raising ladder sections in place along the raise to provide space at the base of the ladder for the insertion of additional sections.

3. Apparatus for use in driving raises by alternating driving and blasting operations at the working face of the raise, comprising a container providing a sheltered space for storage during blasting operations of equipment used at the working face of the raise, extensible struts adapted to rest on one end of said container and at the opposite end against the wall of the raise, said struts serving to support planking utilized to form a working platform used during driving operations, an extensible ladder providing a sheltered passage for conduits extending therethrough and conducting media for actuating power-operated equipment utilized at the working face of the raise, said ladder carrying said container, and a device for extending the ladder to raise the container along the raise.

4. Apparatus as defined in claim 3 including two extensible struts adapted to rest at one end on said container and at the other end against a wall of the raise, seats on the container for receiving said one end of said struts, a cross bar secured to the struts remote from the end thereof supported by said container and platform sections having means for engaging said cross bar to rest thereon, said container being dimensioned to receive and store the aforesaid platform sections and supporting means therefor.

5. Apparatus for use in driving raises by alternating driving and blasting operations at the working face of the raise, comprising a container providing a sheltered storage space during blasting operations for equipment used at the working face, said container having a convexly curved leading end shaped to slide upwards along the rough wall of a raise when the container is advanced along the wall and forming a base for a working platform used during driving operations, an extensible ladder carrying said container and providing a sheltered passage for conduits extending therethrough and conducting media for actuating power-operated equipment utilized at the working face, and means for raising the ladder and the container along the raise.

6. Apparatus for use in driving raises by alternating driving and blasting operations at the working face of the raise, comprising a container providing a sheltered storage space during blasting operations for equipment used at the working face, an extensible sectional ladder carrying said container and resistance to falling material blasted from said face, said ladder providing a protective passage for conduits extending therethrough and conducting media for actuating power-operated equipment utilized at the working face of the raise and a power cylinder at the foot end of said ladder capable of lifting or lowering the ladder a distance at least equal to the length of one of the sections of the ladder, whereby to enable sections of the ladder to be inserted and removed from the foot of the ladder.

7. Apparatus for use in driving raises by alternating driving and blasting operations at the working face of the raise, comprising a sheet steel container capable of resisting material blasted thereover from said face and providing a storage space for use during blasting operations for equipment used at the working face of the raise, a plurality of ladder sections comprising sheet steel shells of substantially semi-circular cross-section, each such shell having a flange at one end shaped to fit into the unflanged end of an adjacent shell to rigidly couple the shells together to form a ladder for supporting said container, footsteps formed on said shells, means within said shells for removably fastening conduits for conducting media for actuating power equipment utilized at the working face of the raise, whereby such conduits may be carried in a protected passage to a place adjacent to the working face, platform supporting members provided at the upper portion of the ladder, platform sections adapted to engage such supporting members to form a working platform adjacent to the working face, a fluid pressure actuated lifting device at the foot of the ladder, means for connecting the lifting device with the lowermost section of the ladder to raise the ladder and the container a distance sufficient to insert an additional ladder section to the ladder at the lower end thereof, and means for engaging the last added ladder section to support the weight of the ladder and the container when the lifting device is disengaged.

References Cited in the file of this patent

UNITED STATES PATENTS

| | | |
|---|---|---|
| 287,042 | Milliken | Oct. 23, 1883 |
| 289,942 | Titus | Dec. 11, 1883 |
| 316,757 | Denison | Apr. 28, 1885 |
| 500,017 | Long | June 20, 1893 |
| 724,953 | Schaller | Apr. 7, 1903 |
| 994,133 | De Jonge | June 6, 1911 |
| 1,114,255 | Greenwood | Oct. 20, 1914 |
| 1,652,431 | Ellis | Dec. 13, 1927 |
| 1,714,451 | Sauvage | May 21, 1929 |
| 1,926,696 | Murphy | Sept. 12, 1933 |
| 2,502,228 | Miller | Mar. 28, 1950 |

FOREIGN PATENTS

| | | |
|---|---|---|
| 535,452 | Germany | Oct. 10, 1931 |